United States Patent
Ghosh et al.

(10) Patent No.: US 11,569,994 B2
(45) Date of Patent: Jan. 31, 2023

(54) ACCELERATING MULTIPLE POST-QUANTUM CRYPTOGRAHY KEY ENCAPSULATION MECHANISMS

(71) Applicant: Intel Corporation, Santa Clara, CA (US)

(72) Inventors: Santosh Ghosh, Hillsboro, OR (US); Andrew Reinders, Portland, OR (US); Manoj Sastry, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/356,972

(22) Filed: Jun. 24, 2021

(65) Prior Publication Data
US 2022/0417019 A1    Dec. 29, 2022

(51) Int. Cl.
*H04L 9/30* (2006.01)
*H04L 9/06* (2006.01)
*H04L 9/14* (2006.01)

(52) U.S. Cl.
CPC .......... *H04L 9/3093* (2013.01); *H04L 9/0637* (2013.01); *H04L 9/14* (2013.01)

(58) Field of Classification Search
CPC ........ H04L 9/3093; H04L 9/0637; H04L 9/14
See application file for complete search history.

(56) References Cited

U.S. PATENT DOCUMENTS

| 9,942,039 | B1 * | 4/2018 | Gutoski | G06F 5/00 |
| 2020/0153618 | A1 * | 5/2020 | Bhattacharya | H04L 9/0841 |
| 2020/0159568 | A1 * | 5/2020 | Goyal | G06F 9/4843 |
| 2020/0259649 | A1 * | 8/2020 | Garcia Morchon | H04L 9/0819 |
| 2021/0099290 | A1 * | 4/2021 | Tomlinson | H04L 9/14 |
| 2021/0359868 | A1 * | 11/2021 | Poeppelmann | H04L 9/3271 |

FOREIGN PATENT DOCUMENTS

WO    0146800 A2    6/2001

OTHER PUBLICATIONS

Examining Various Implementation and Design Choices of LWR based KEM, by Suparna Kundu, published Jul. 2020 (Year: 2020).*
Banerjee, Abhishek et al. "Pseudorandom Functions and Lattices" International Association for Cryptologic Research 2012, EUROCRYPT 2012, LNCS 7237, pp. 719-737.
Fujisaki, Eiichiro et al. "Secure Integration of Asymmetric and Symmetric Encryption Schemes", International Association for Cryptologic Research, J Cryptol vol. 26, published online Dec. 2, 2011, pp. 80-101.

(Continued)

*Primary Examiner* — Vu V Tran
(74) *Attorney, Agent, or Firm* — Jaffery Watson Mendonsa & Hamilton LLP

(57) ABSTRACT

An accelerator includes polynomial multiplier circuitry including at least one modulus multiplier operating according to a mode. The at least one modulus multiplier include a multiplier to multiply two polynomial coefficients to generate a multiplication result, a power of two reducer to reduce the multiplication result to a reduced multiplication result when the mode is a power of two mode, and a prime modulus reducer to reduce the multiplication result to the reduced multiplication result when the mode is a prime modulus mode.

17 Claims, 5 Drawing Sheets

(56) References Cited

OTHER PUBLICATIONS

"Key Encapsulation: A New Scheme for Public-Key Encryption", XML Security Working Group F2F, May 2009, all pages.

Lippert, Jan "The Fujisaki-Okamoto Transformation" University of Paderborn, The University of the Information Society, Faculty of Electrical Engineering, Computer Science and Mathematics, Nov. 22, 2014, all pages.

Longa, Patrick et al. "Speeding up the Number Theoretic Transform for Faster Ideal Lattice-Based Cryptography", Microsoft Research, retrieved from the internet <https://eprint.iacr.org/2016/504.pdf>, accessed on Jul. 7, 2021, pp. 1-18.

Ravi, Prasanna et al. "Lattice-Based Key Sharing Schemes: A Survey", vol. 1, No. 1, Article, Oct. 2020, pp. 1-39.

Regev, Oded "On Lattices, Learning with Errors, Random Linear Codes, and Cryptography", May 2, 2009, pp. 1-37.

Wang, Yang et al. "Module-LWE versus Ring-LWE, Revisited", retrieved from the internet <https://eprint.iacr.org/2019/930 pdf>, access on Jul. 7, 2021, pp. 1-28.

Aikata et al., "A Unified Cryptoprocessor for Lattice-Based Signature and Key-Exchange," Jun. 11, 2021, 18 pages.

European Union Agency for Cybersecurity (ENISA), "Post-Quantum Cryptography," ENISA Report, Feb. 2021, 37 pages.

International Search Report & Written Opinion, PCT Application No. PCT/US2022/018467, dated Jun. 9, 2022, 10 pages, EPO.

\* cited by examiner

ACCELERATING MULTIPLE POST-QUANTUM CRYPTOGRAHY KEY ENCAPSULATION MECHANISMS

BACKGROUND

Key encapsulation mechanisms (KEMs) are a class of encryption techniques designed to secure symmetric cryptographic key material for transmission using asymmetric (public key) algorithms for post-quantum cryptography. In practice, public key systems are clumsy to use in transmitting long messages. Instead, they are often used to exchange symmetric keys, which are relatively short. The symmetric key is then used to encrypt the longer message. The traditional approach to sending a symmetric key with public key systems is to first generate a random symmetric key and then encrypt it using the chosen public key algorithm. The recipient then decrypts the public key message to recover the symmetric key. As the symmetric key is generally short, padding is required for full security and proofs of security for padding schemes are often less than complete. KEMs simplify the process by generating a random element in the finite group underlying the public key system and deriving the symmetric key by hashing that element, eliminating the need for padding.

Multiple hardware based KEMs are being developed that are based on solving different underlying hard problems by using mathematical operations, such as decoding linear code, module learning with error (LWE), and module learning with rounding (LWR). These KEMs share some common structures but have different choices of parameters and different implementations. A hardware solution designed for providing one KEM will not work for other KEMs.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
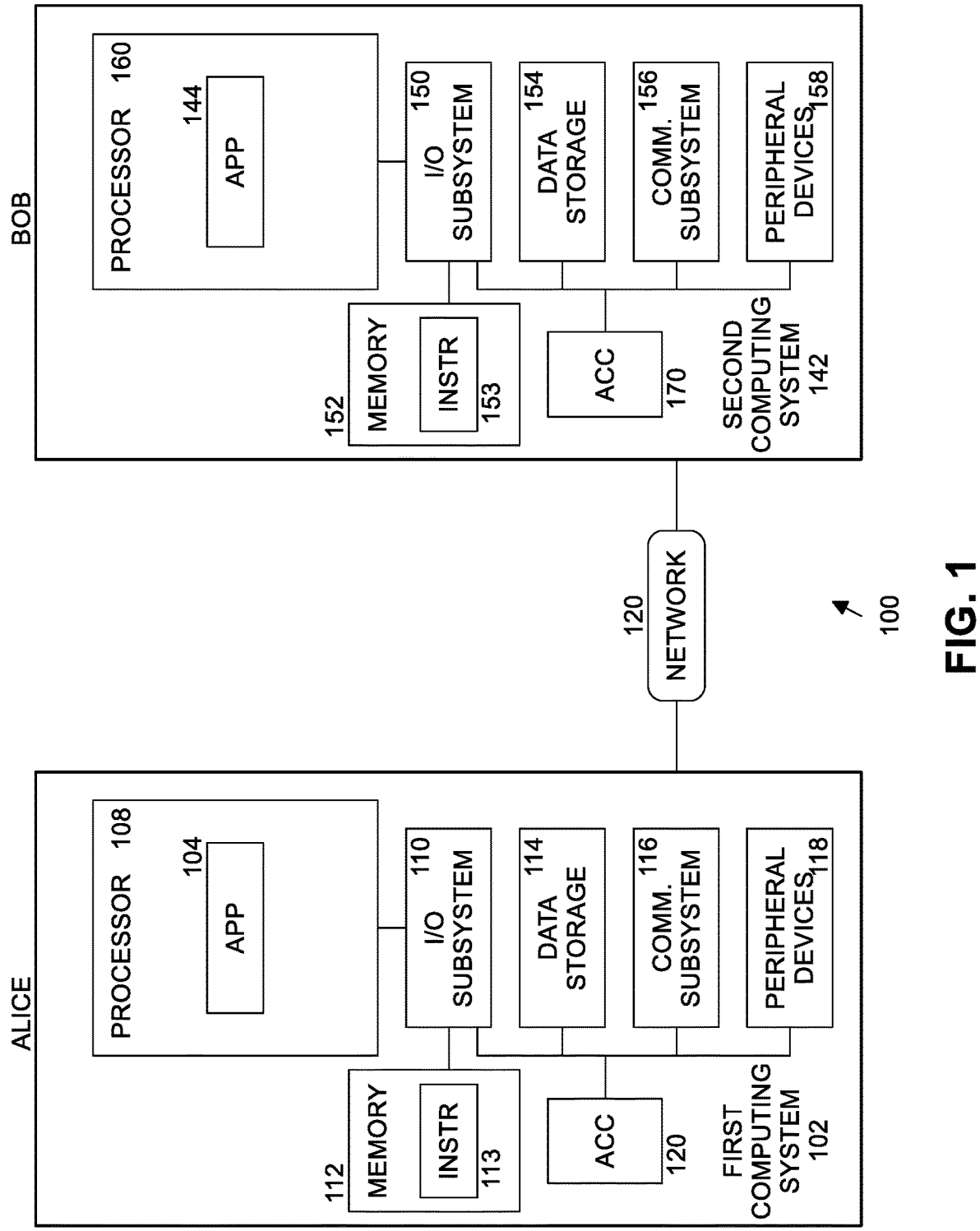
FIG. 1 is a block diagram of two computing systems according to one or more embodiments.

The technology described herein provides an optimized hardware accelerator supporting post-quantum cryptography that exploits commonalities among multiple lattice-based KEMs. Embodiments support multiple KEMs using a Secure Hash Algorithm-3 (SHA-3) based pseudo random number generation (PRNG), Random Oracles that generate random outputs for a given query, and Centered Binomial Distributions (CBDs) for secret generation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Referring now to FIG. 1, an illustrative computing environment 100 for secure communication of a shared secret includes first computing system 102 and second computing system 142 coupled over network 120. In one embodiment, for cryptographic purposes one or more components of first computing system 102 is also called Alice, and one or more components of second computing system 142 is also called Bob. In another embodiment, one or more components of first computing system 102 is called Bob and one or more components of second computing system 142 is called Alice. First computing system 102 includes processor 108 to execute instructions (Instr) 113 stored in memory 112. Instructions 113 comprise at least one application 104 (App). Application 104 comprises any application program having at least one workload to be processed. In some processing scenarios, application 104 offloads one or more operations, including cryptographic operations (e.g., key generation, key encapsulation, key decapsulation, encryption, and decryption), to accelerator 120 (Acc) to be performed more efficiently than performing the one or more operations on processor 108.

Second computing system 142 includes processor 160 to execute instructions (Instr) 153 stored in memory 152. Instructions 153 comprise at least one application 144. Application 144 also comprises any application program having at least one workload to be processed. In some processing scenarios, application 144 offloads one or more operations, including cryptographic operations, to accelerator 170 (Acc) to be performed more efficiently than performing the one or more operations on processor 160.

Applications 104 and 144 communicate with each other in a secure manner using known cryptographic methods and operations. That is, application 104 may encrypt information to securely send the information to application 144 over unsecure network 120, which decrypts the encrypted information, and vice versa.

In an embodiment, applications 104, 144 are the same application. In another embodiment, applications 104, 144 are different applications. In at least one embodiment, one or both of accelerator 120 and 170 is implemented as a field programmable gate array (FPGA).

In various computing environments, there may be any number of processors 108 and accelerators 120 on first computing system 102, any number of processors 160 and accelerators 170 on second computing system 142, and any number of first computing systems coupled to any number of second computing systems. In some large-scale cloud computing environments, the number of applications 104 and 144, first computing systems 102, second computing systems 104, and associated accelerators 120, 170 may be large (e.g., tens of systems, hundreds of systems, thousands of systems, tens of thousands of systems, thousands or millions of system components, etc.).

First computing system 102 and second computing system 142 can be embodied as any type of device capable of performing the functions described herein. For example, computing systems 102, 142 can be implemented as, without limitation, a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a disaggregated server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

As shown in FIG. 1, the illustrative computing systems 102, 142 include processors 108, 160, input/output (I/O) subsystems 110, 150, memories 112, 152, and data storage devices 114, 154, respectively. Additionally, in some embodiments, one or more of the illustrative components can be incorporated in, or otherwise form a portion of, another component. For example, memories 112, 152, or portions thereof, can be incorporated in processors 108, 160, respectively, in some embodiments.

Processors 108, 160 can be implemented as any type of processor capable of performing the functions described herein. For example, processors 108, 160 can be embodied as a single or multi-core processor(s), digital signal processor, microcontroller, or other processor or processing/controlling circuit.

Memories 112, 142 can be implemented as any type of volatile or non-volatile memory or data storage capable of performing the functions described herein. In operation, the memories 112, 152 store various data and software used during operation of computing systems 102, 142 such as operating systems, applications, programs, libraries, and drivers. As shown, memories 112, 152 are communicatively coupled to the processors 108, 160 via I/O subsystems 110, 150 which are implemented as circuitry and/or components to facilitate input/output operations with processors 108, 120, memories 112, 152, and other components of the computing systems, respectively. For example, the I/O subsystems 110, 150 can be implemented as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, memories 112, 152 are directly coupled to processors 108, 160, respectively, for example via an integrated memory controller hub. Additionally, in some embodiments, I/O subsystems 110, 150 form a portion of a system-on-a-chip (SoC) and are incorporated, along with processors 108, 160, memories 112, 152 accelerators 120, 170, respectively, and/or other components of the computing systems, on a single integrated circuit chip. Additionally or alternatively, in some embodiments processors 108, 160 include an integrated memory controller and a system agent, which may be embodied as a logic block in which data traffic from processor cores and I/O devices converges before being sent to memories 112, 152.

Data storage devices 114, 154 can be implemented as any type of device or devices configured for short-term or long-term storage of data such as, for example, memory devices and circuits, memory cards, hard disk drives, solid-state drives, non-volatile flash memory, or other data storage devices. Computing systems 102, 142 can also include communications subsystems 116, 156 which can be implemented as any communication circuit, device, or collection thereof, capable of enabling communications between computing systems 102, 142 over a network 120. Communications subsystems 116, 156 can be configured to use any one or more communication technology (e.g., wired or wireless communications) and associated protocols (e.g., Ethernet, Bluetooth®, WiMAX, 3G, 4G LTE, etc.) to implement such communication.

Accelerators 120, 170 can be implemented as a FPGA, an application-specific integrated circuit (ASIC), a coprocessor, or other digital logic device capable of performing accelerated functions (e.g., accelerated application functions, accelerated network functions, or other accelerated functions), including accelerated cryptographic functions. Illustratively, accelerators 120, 170 are FPGAs, which are implemented as an integrated circuit including programmable digital logic resources that may be configured after manufacture. The FPGAs include, for example, a configurable array of logic blocks in communication over a configurable data interchange. Accelerators 120, 170 are coupled to the processors 108, 160 via high-speed connection interfaces such as peripheral buses (e.g., peripheral component interconnect (PCI) Express buses) or inter-processor interconnects (e.g., in-die interconnects (IDIs) or QuickPath Interconnects (QPIs)), or via any other appropriate interconnects. Accelerators 120, 170 receive data and/or commands for processing from the processors and return results data to the processors.

Computing systems 102, 142 further include one or more peripheral devices 118, 158. Peripheral devices 118, 158 include any number of additional input/output devices, interface devices, hardware accelerators, and/or other peripheral devices. For example, in some embodiments, peripheral devices 118, 158 include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

It is to be appreciated that lesser or more equipped computing systems than the examples described above may be preferred for certain implementations. Therefore, the configuration of computing systems 102, 142 can vary from implementation to implementation depending upon numerous factors, such as price constraints, performance requirements, technological improvements, or other circumstances.

The technology described herein can be implemented as any or a combination of one or more microchips or integrated circuits interconnected using a parent board, hardwired logic, software stored by a memory device and executed by a microprocessor, firmware, an application specific integrated circuit (ASIC), and/or an FPGA. The term "logic" includes, by way of example, software or hardware and/or combinations of software and hardware.

A key encapsulation mechanism (KEM) is a cryptographic technique used to securely establish a shared secret between two parties. For example, application 104 on Alice may be required to securely share a secret with application 144 on Bob (or vice versa). In an embodiment, the shared secret is a cryptographic key (such as a symmetric key) which can be used to encrypt and decrypt information by Alice and/or Bob.

One type of KEM is a lattice-based KEM. Some lattice-based KEMs are described in "Lattice-Based Key Sharing Schemes: A Survey" by Prasanna Ravi, et al., Association of Computing Machinery (ACM) Computing Surveys, Volume 54, Issue 1, published Jan. 2, 2021. A lattice-based KEM generally works as described below.

During a key generation operation, at a first step Alice generates an instance {s, (A, b)}, where s is a private key of Alice and (A, b) is used as a corresponding public key, where A is a two-dimensional (2D) matrix of polynomials representing a lattice, and b is a (one dimensional (1D)) tuple of polynomials. In an embodiment, the instance is a Learning with Error (LWE) instance as described in "On Lattices, Learning with Errors, Random Linear Codes, and Cryptography" by Oded Regev, Journal of the ACM, 56(6): 34, May 2, 2009. In this embodiment, LWE uses a prime modulus for reduction of the result of multiplying polynomial coefficients. In another embodiment, the instance is a Learning with Rounding (LWR) instance as described in "Pseudorandom Functions and Lattices" by Abhishek Banerjee, et al., International Association for Cryptological Research, 2012. In this embodiment, LWR uses a power of two for reduction of the result of multiplying polynomial coefficients. At a second step of the key generation operation, Alice sends the public key (A, b) to Bob.

At a first step of a key encapsulation operation, Bob generates an ephemeral instance {s', (A, b')} using the same A received from Alice, where b' is tuple of polynomials, and s' is kept secret (e.g., s' is Bob's ephemeral private key). In an embodiment, this instance is an LWE instance when Alice generated an LWE instance, and an LWR instance when Alice generated an LWR instance. For example, an LWR instance of (s', (A, b')) could be b'=A*s' +h, where h is a constant 1D tuple of polynomials and * represents the multiplication operation. Whereas for an LWE instance, b'=A*s'+h, where h is a randomly generated CBD 1D tuple of polynomials and * represents the multiplication operation. At a second step of the key encapsulation operation, Bob encrypts a message m (e.g., a nonce value) using Bob's private key s' and Alice's public key part b to form ciphertext c=E (s', b, m). At a third step of the key encapsulation operation, Bob computes the shared secret K=Hash (A∥b∥m∥c). In an embodiment, the hash operation is NIST standard SHA-3, a secure cryptographic hash function used to accommodate the public key of Alice, the randomly generated message and the corresponding ciphertext to generate the share secret symmetric key. SHA-3 is published by the National Institute of Standards and technology (NIST), Aug. 5, 2015, or later versions. In an embodiment, the shared secret K may be a symmetric key value. At a fourth step of the key encapsulation operation, Bob sends ciphertext c and b' to Alice.

At a first step of a key decapsulation operation, Alice decrypts the received ciphertext c using Alice's private key s as new message m'=D (s, c). At a second step of the key decapsulation operation, Alice computes a Fujisaki-Okamoto (FO) transform to generate the shared secret K. The FO transform is described in "Secure Integration of Asymmetric and Symmetric Encryption Schemes" by Eiichiro Fujisaki and Tatsuaki Okamoto, J. Cryptol. (2013) 26c:80-101. At part A of the second step of the key decapsulation operation, Alice re-encrypts the computed m' to generate ciphertext c' using b' sent by Bob. At part B of the second step, Alice verifies that received ciphertext c matches the newly generated ciphertext c'. At part C of the second step, if received ciphertext c matches newly generated ciphertext c', then Alice computes the shared secret K=Hash (A∥b∥m'∥c'). At this point, the K generated by Bob and the K generated by Alice are verified to be the same value and can be used as a shared secret. At part D of the second step, if the received c does not match the newly generated ciphertext c', then Alice computes a garbage K'=Hash (z), where z is a random value. This garbage K' is not used.

Implementation of the first step in the key generation, the first and second steps of the key encapsulation operation, and the first step and part B of the second step in the key decapsulation operation comprise multiple degree-256 polynomial multiplications. Different KEM schemes define the coefficients within the degree-256 polynomials in different ways. In one example, the coefficients are defined as elements of a finite field over a selected or predetermined prime number q, which means all coefficient values are integers between [1, q−1]. In another example, the coefficients are n-bit numbers, so a coefficient can have any integer value between {0, $2^n$−1}, where n is a natural number. The technology described herein proposes a common coefficient multiplication unit, called a modulus multiplier (MM), comprising a degree-256 polynomial multiplier for KEMs that use either of above two types of coefficients.

In an embodiment, A may be a 2×2 matrix where four elements may be represented as A0, A1, A2, A3. Each element of the matrix is a polynomial with degree 256 such as: $a_{256}X^{255}+a_{256}X^{254}+\ldots+a_2X^1+a_1X^0$, where each coefficient $a_i$ is a number less than a predefined modulus. The 1D tuple polynomial s may have two elements [s1, s0] where each of them is a polynomial with degree 256 as described above. A multiplication between A and s has to be performed, which involves four polynomial multiplications and two polynomial additions.

Figure 2:
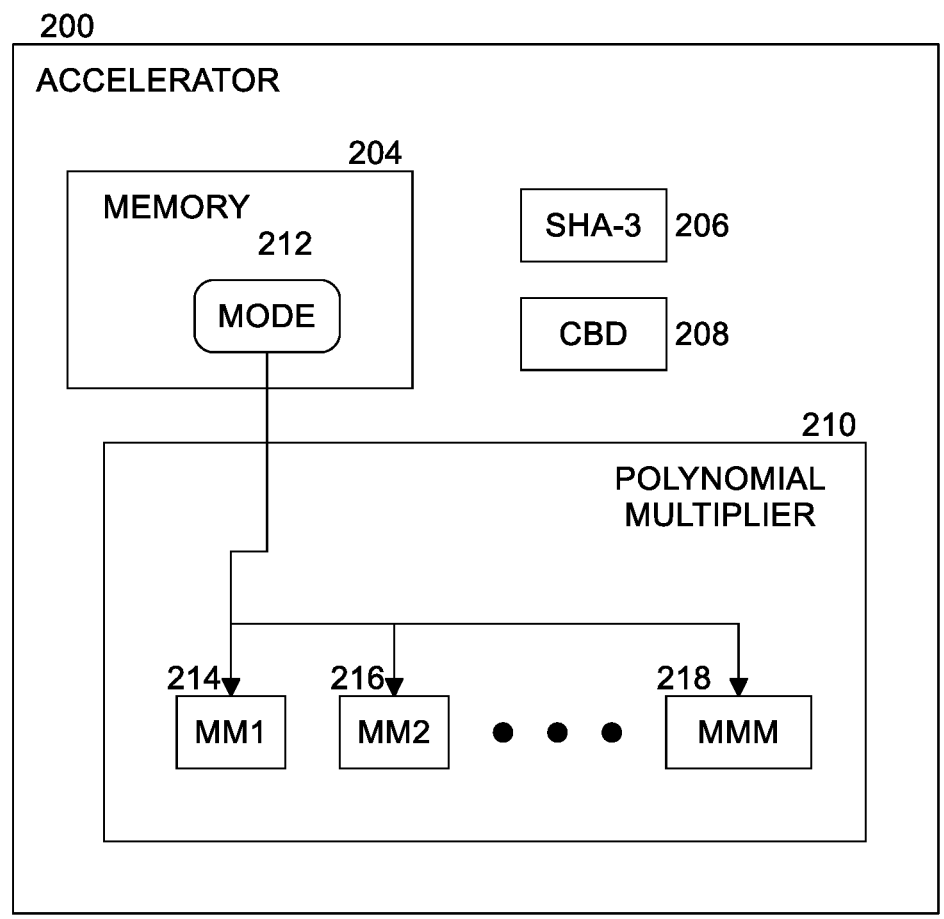
FIG. 2 is a block diagram of an accelerator according to one or more embodiments.

FIG. 2 is a block diagram of an accelerator 200 according to one or more embodiments. Accelerator 200 is an example of accelerator 120 and 170 of FIG. 1. Accelerator 202 performs cryptographic operations for Alice and/or Bob (e.g., first computing system 102 and/or second computing system 142), including one or more of the steps described above for key generation, encapsulation and decapsulation operations for lattice-based KEMs. Accelerator 200 includes memory 204 for storing data. Memory 204 stores data received from other components of first computing system 102 or second computing system 142, data to be sent to other components of first computing system 102 or second computing system 142, or intermediate data values resulting from internal operations of accelerator 200. In an embodiment, memory 204 stores mode 212, which indicates either prime modulus or power of two modulus. For example, the mode=1 represents prime modulus and mode=0 represents power-of-two modulus. Accelerator 200 includes SHA-3 206 circuitry to perform hash operations as described in Secure Hash Algorithm 3, published by the National Institute of Standards and technology (NIST), Aug. 5, 2015, or later versions. This is used for pseudorandom bitstream generation used for generating lattice A. Accelerator includes Centered Binomial Distributions (CBD) 208 to generate secrets s for Alice and s' for Bob.

Accelerator 200 includes polynomial multiplier 210 to efficiently perform polynomial multiplication operations on multiple degree-256 integer coefficients as part of cryptographic processing (e.g., key generation, key encapsulation, key decapsulation) for lattice-based KEMs. In an embodiment, mode 212 indicates either LWE (prime modulus) or LWR (power of two) processes are being used by Alice and Bob. Polynomial multiplier 210 includes one or more modulus multipliers (MMs). For example, polynomial multiplier 210 includes MM1 214, MM2 216, . . . MMM 218, where M is a natural number. Each modulus multiplier provides identical processing to any other modulus multiplier. Polynomial multiplier 210 controls assigning a pair of degree-256 integer coefficients of polynomials to one of the MMs for processing and receives a reduced multiplication result from the assigned MM, as part of performing a KEM.

Scaling the number M of MMs involves a trade-off between silicon area used in the accelerator and latency. For example, a polynomial multiplier 210 with just a single MM unit (e.g., MM1 214) costs the minimum silicon area, but the single MM requires 256×256 cycles to compute one degree-256 polynomial multiplication for coefficients of $\{0, 2^n-1\}$ defined with a power of two modulus.

For other types of polynomials where the coefficients are defined with a prime modulus, in an embodiment the multiplications between two polynomials can be performed in three steps. Step 1 is called a Forward Number Theoretic Transform (NTT) where the degree-256 polynomial is converted to an NTT form. In an embodiment, the NTT conversion is performed as described in "Speeding up the Number Theoretic Transform for Faster Ideal Lattice-Based Cryptography" by Patrick Longa and Michael Naehrig, International Conference on Cryptology and Network Security, CANS, Lecture Notes in Computer Science, pp. 124-139, (2106). Step 2 is called Coefficient Wise Multiplications where the coefficients of two polynomials of same degree are multiplied to generate the coefficients. Step 3 is called Backward NTT where the resultant coefficients of Step 2 are combined to form the resultant degree-256 polynomial.

In an embodiment, if there is one MINI (e.g., MM1 214) in polynomial multiplier 210, then Steps 1 and 3 can each be computed in 1,024 cycles and Step 2 can be computed in 256 cycles. The overall multiplication latency in this case is 2,304 cycles.

In other embodiments, the latency can be further improved by incorporating more MINI blocks. If there are two MMs in polynomial multiplier 210, then the latency of the above multiplication would be half of the one MINI case. Adding a MM results in a 50% reduction of the latency. Note that adding more MINI units to polynomial multiplier 210 results in increased requirements for silicon area on accelerator 200, and also results in increases for additional storage in memory 204 for accessing multiple coefficients in parallel and to store more intermediate results in parallel within memory 204. In an embodiment, a reduction of approximately 60% of silicon area used for the polynomial multiplier may be achieved.

Figure 3:
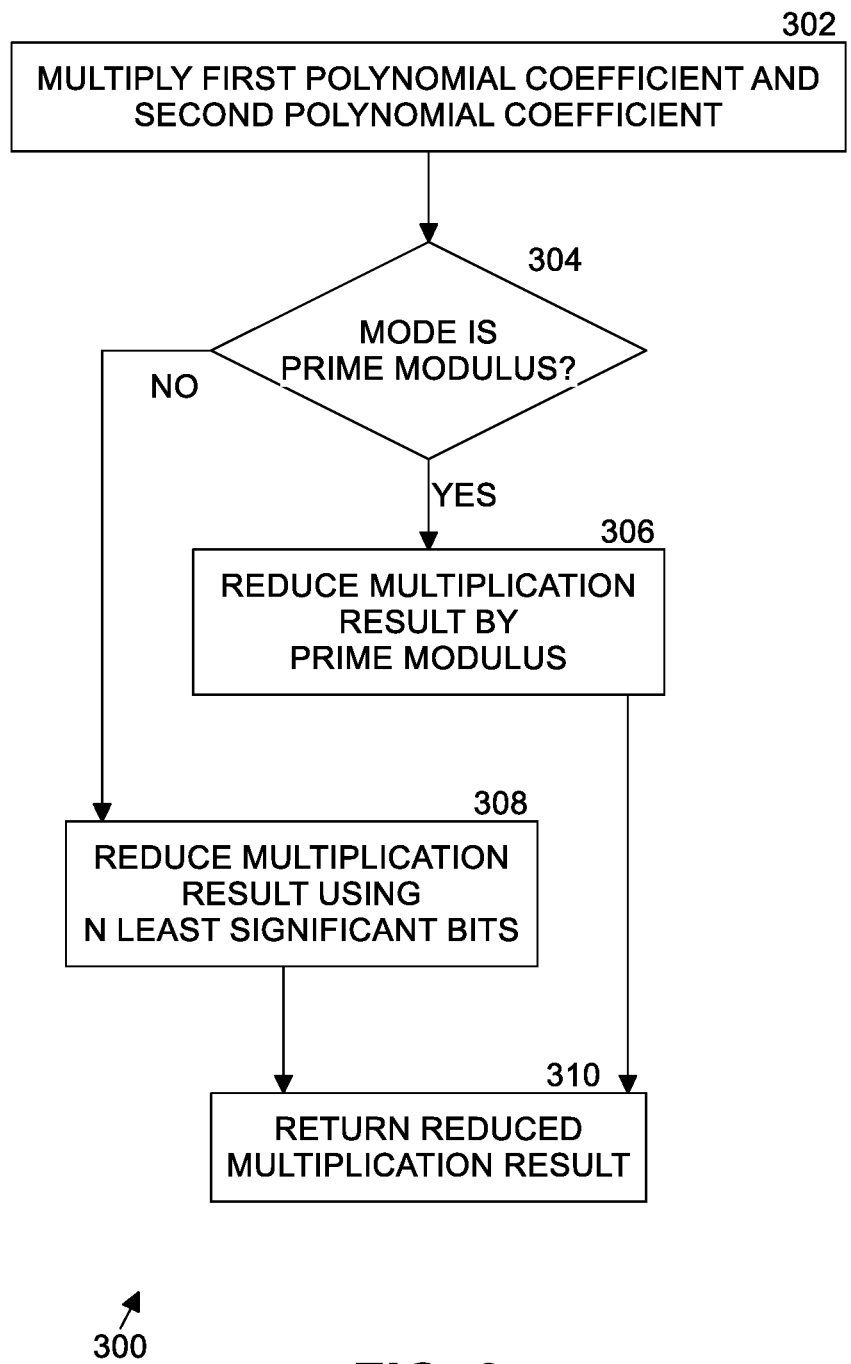
FIG. 3 is a flow diagram of modulus multiplier (MM) processing according to one or more embodiments.

FIG. 3 is a flow diagram 300 of modulus multiplier (MM) processing according to one or more embodiments. At block 302, a MM (e.g., one of MM1 214, MM2 216, . . . MMM 218) multiplies a first polynomial coefficient and a second polynomial coefficient. For prime modulus based KEMs (e.g., for LWE), the polynomial multiplication is performed using NTT representation as described above. For power-of-two modulus based KEMs (e.g., for LWR), the polynomial multiplication is performed using "schoolbook" polynomial multiplication with multiple iterations. To multiply polynomial A1 with polynomial s1 in the school-book method, the multiplication of each coefficient of A1 with each coefficient of s1 is computed, which involves 256×256 coefficient multiplications. Each polynomial coefficient has n bits, where n is a natural number. At block 304, if the mode 212 is set to prime modulus (e.g., for LWE instances), then at block 306 the MM reduces the multiplication result of performing block 302 by prime modulus. That is, the multiplication result % prime number=reduced multiplication result. The modulus is the input of the KEM algorithm which is stored inside a hardware register. At block 304, if the mode 212 is not set to prime modulus (e.g., for LWR instances), then at block 308 the multiplication result of performing block 302 does not need to be reduced. Instead, for this "power of 2" case, MM takes the n least significant bits of the multiplication result (having 2n bits) as the reduced multiplication result. At block 310, the MM computes the reduced multiplication result which is used as the intermediate result and stored into the memory.

Figure 4:
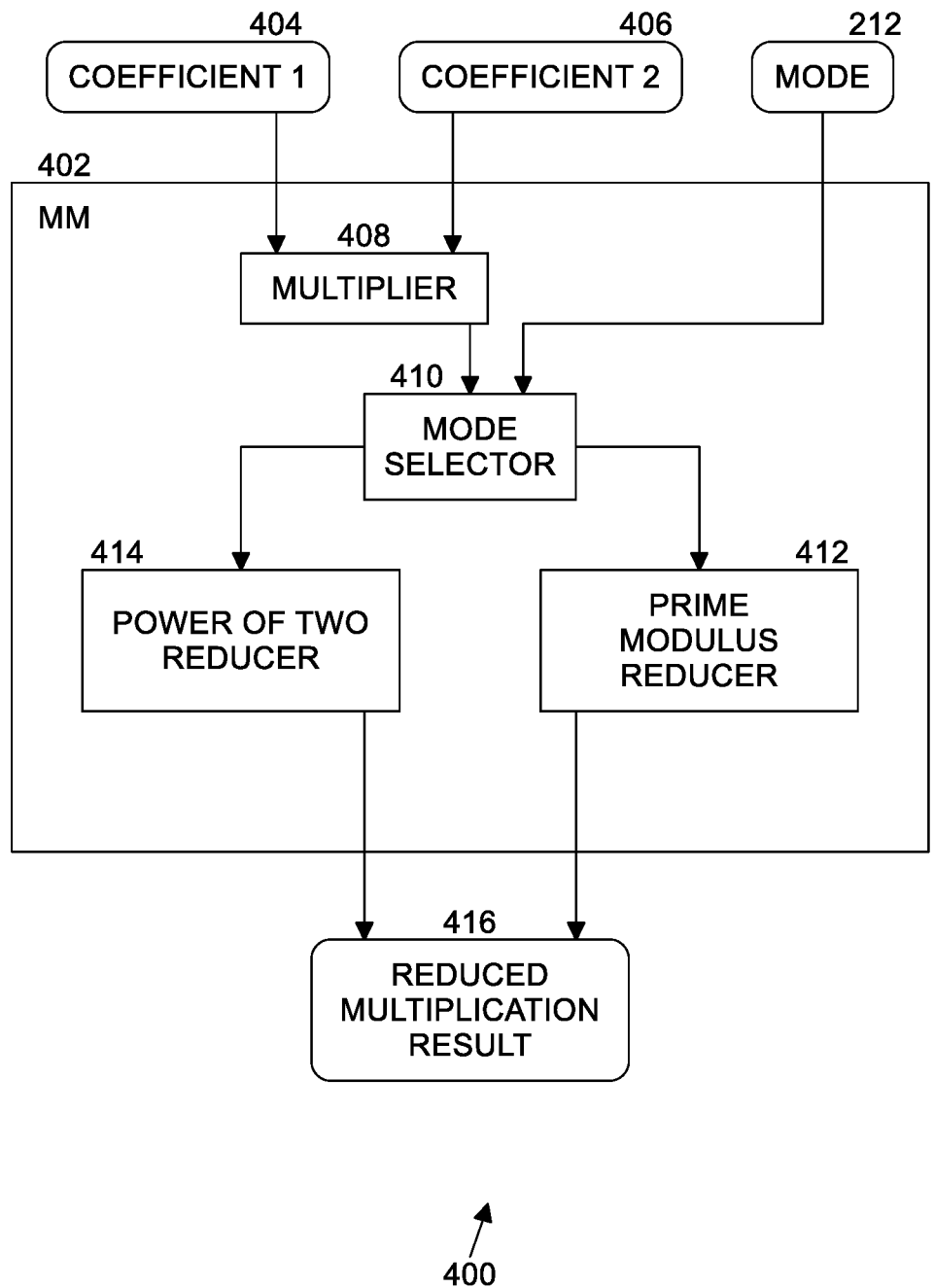
FIG. 4 is a diagram of a modulus multiplier (MM) according to one or more embodiments.

FIG. 4 is a diagram of a modulus multiplier (MM) 402 according to one or more embodiments. MM 402 is an example of MM1 214, MM2 216, . . . MMM 218 of FIG. 2. MM 402 takes as input parameters a first polynomial coefficient 404, a second polynomial coefficient 406, and mode 212, and produces reduced multiplication result 416. MM 402 includes multiplier 408 to multiply the first and second polynomial coefficients 404, 406 as described above in block 302. For the schoolbook method, one coefficient of A1 is multiplied with M coefficients of the other polynomial s1. For the NTT method, M different coefficients of A1 are multiplied with M different coefficients of s1. Mode selector 410 uses mode 212 to send the multiplication result to either power of two reducer 414 (for power of two modulus, e.g., LWR instances) or prime modulus reducer 412 (for prime modulus, e.g., LWE instances). Power of two reducer 414 or prime modulus reducer 412 generates reduced multiplication result 416 as described above for blocks 308 and 306, respectively.

Figure 5:
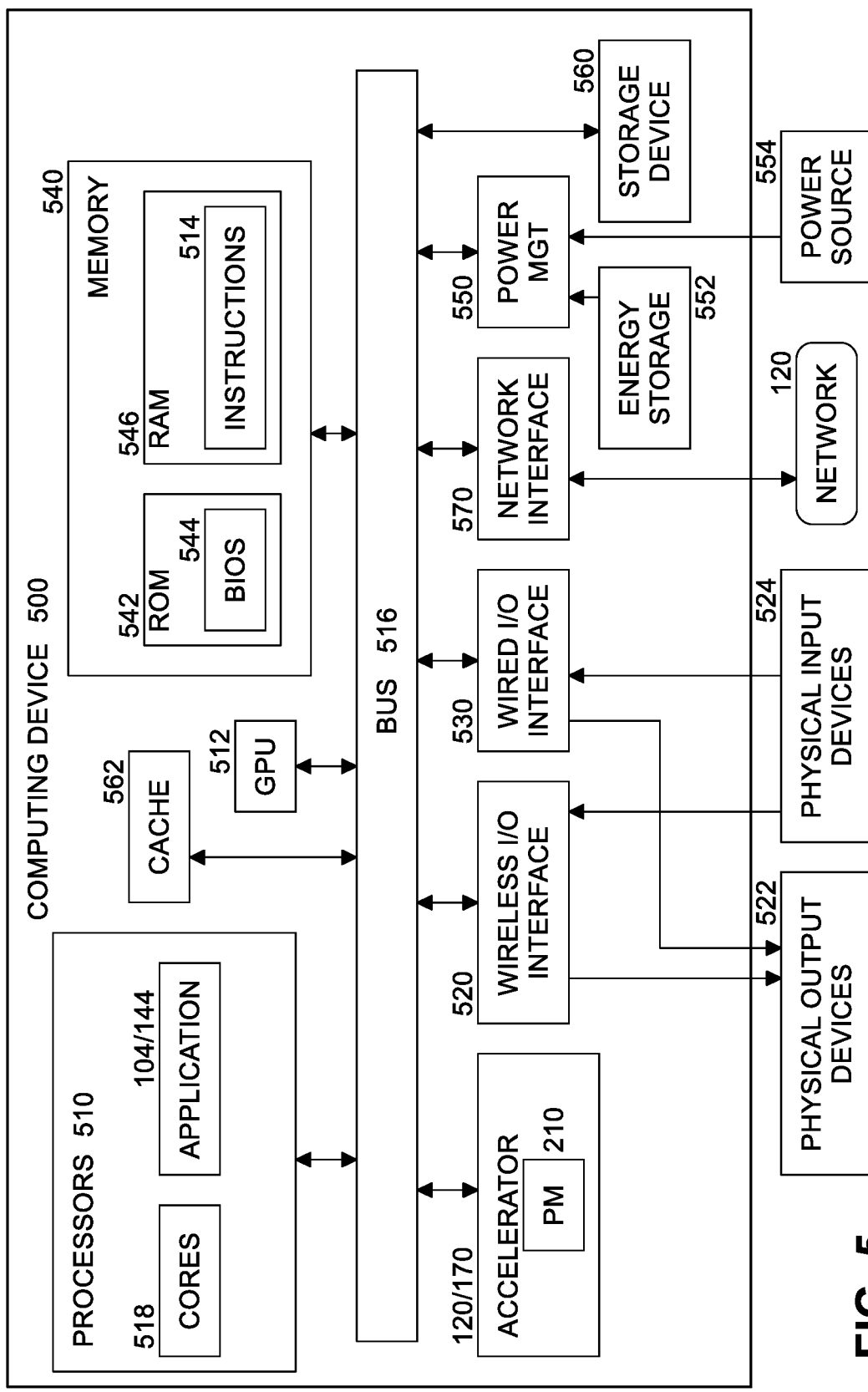
FIG. 5 is a schematic diagram of an illustrative electronic computing device to perform cryptographic processing according to some embodiments.

FIG. 5 is a schematic diagram of an illustrative electronic computing device to perform remoting to an accelerator processing according to some embodiments. Electronic computing device 500 is representative of computing systems 102 and 142. In some embodiments, computing device 500 includes one or more processors 510 including one or more processors cores 518 and application 104 or 144. In some embodiments, the computing device 500 includes an accelerator 120 or 170. In some embodiments, the computing device performs KEM processing as described above in FIGS. 1-4.

Computing device 500 may additionally include one or more of the following: cache 562, a graphical processing unit (GPU) 512 (which may be hardware accelerator 120/170 in some implementations), a wireless input/output (I/O) interface 520, a wired I/O interface 530, memory circuitry 540, power management circuitry 550, non-transitory storage device 560, and a network interface 570 for connection to a network 120. The following discussion provides a brief, general description of the components forming the illustrative computing device 500. Example, non-limiting computing devices 500 may include a desktop computing device, blade server device, workstation, laptop computer, mobile phone, tablet computer, personal digital assistant, or similar device or system.

In embodiments, the processor cores 518 are capable of executing machine-readable instruction sets 514, reading data and/or instruction sets 514 from one or more storage devices 560 and writing data to the one or more storage devices 560. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, FPAGs, Internet of Things (IOT) devices, and the like. For example, machine-readable instruction sets 514 may include instructions to implement KEM processing, as provided above in FIGS. 1-4.

The processor cores 518 may include any number of hardwired or configurable circuits, some or all of which may include programmable and/or configurable combinations of electronic components, semiconductor devices, and/or logic elements that are disposed partially or wholly in a PC, server, mobile phone, tablet computer, or other computing system capable of executing processor-readable instructions.

The computing device 500 includes a bus or similar communications link 516 that communicably couples and facilitates the exchange of information and/or data between various system components including the processor cores 518, the cache 562, the graphics processor circuitry 512, one or more wireless I/O interfaces 520, one or more wired I/O interfaces 530, one or more storage devices 560, one or more network interfaces 570, and/or accelerator 120/170. Accelerator 120/170 includes polynomial multiplier (PM) 210. The computing device 500 may be referred to in the singular herein, but this is not intended to limit the embodiments to a single computing device 500, since in certain embodiments, there may be more than one computing device 500 that incorporates, includes, or contains any number of communicably coupled, collocated, or remote networked circuits or devices.

The processor cores 518 may include any number, type, or combination of currently available or future developed devices capable of executing machine-readable instruction sets.

The processor cores 518 may include (or be coupled to) but are not limited to any current or future developed single-core or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 5 are of conventional design. Consequently, such blocks need not be described in further detail herein, as they will be understood by those skilled in the relevant art. The bus 516 that interconnects at least some of the components of the computing device 500 may employ any currently available or future developed serial or parallel bus structures or architectures.

The system memory 540 may include read-only memory ("ROM") 542 and random-access memory ("RAM") 546. A portion of the ROM 542 may be used to store or otherwise retain a basic input/output system ("BIOS") 544. The BIOS 544 provides basic functionality to the computing device 500, for example by causing the processor cores 518 to load and/or execute one or more machine-readable instruction sets 514. In embodiments, at least some of the one or more machine-readable instruction sets 514 causes at least a portion of the processor cores 518 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 500 may include at least one wireless input/output (I/O) interface 520. The at least one wireless I/O interface 520 may be communicably coupled to one or more physical output devices 522 (tactile devices, video displays, audio output devices, hardcopy output devices, etc.). The at least one wireless I/O interface 520 may communicably couple to one or more physical input devices 524 (pointing devices, touchscreens, keyboards, tactile devices, etc.). The at least one wireless I/O interface 520 may include any currently available or future developed wireless I/O interface. Example wireless I/O interfaces include, but are not limited to: BLUETOOTH®, near field communication (NFC), and similar.

The computing device 500 may include one or more wired input/output (I/O) interfaces 530. The at least one wired I/O interface 530 may be communicably coupled to one or more physical output devices 522 (tactile devices, video displays, audio output devices, hardcopy output devices, etc.). The at least one wired I/O interface 530 may be communicably coupled to one or more physical input devices 524 (pointing devices, touchscreens, keyboards, tactile devices, etc.). The wired I/O interface 530 may include any currently available or future developed I/O interface. Example wired I/O interfaces include but are not limited to universal serial bus (USB), IEEE 1394 ("FireWire"), and similar.

The computing device 500 may include one or more communicably coupled, non-transitory, data storage devices 560. The data storage devices 560 may include one or more hard disk drives (HDDs) and/or one or more solid-state storage devices (SSDs). The one or more data storage devices 560 may include any current or future developed storage appliances, network storage devices, and/or systems. Non-limiting examples of such data storage devices 560 may include, but are not limited to, any current or future developed non-transitory machine-readable storage mediums, storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 560 may include one or more removable storage devices, such as one or more flash drives, flash memories, flash storage units, or similar appliances or devices capable of communicable coupling to and decoupling from the computing device 500.

The one or more data storage devices 560 may include interfaces or controllers (not shown) communicatively coupling the respective storage device or system to the bus 516. The one or more data storage devices 560 may store, retain, or otherwise contain machine-readable instruction sets, data structures, program modules, data stores, databases, logical structures, and/or other data useful to the processor cores 518 and/or graphics processor circuitry 512 and/or one or more applications executed on or by the processor cores 518 and/or graphics processor circuitry 512. In some instances, one or more data storage devices 560 may be communicably coupled to the processor cores 518, for example via the bus 516 or via one or more wired communications interfaces 530 (e.g., Universal Serial Bus or USB); one or more wireless communications interfaces 520 (e.g., Bluetooth®, Near Field Communication or NFC); and/or one or more network interfaces 570 (IEEE 802.3 or Ethernet, IEEE 802.11, or Wi-Fi®, etc.).

Processor-readable instruction sets 514 and other programs, applications 104, 144, logic sets, and/or modules may be stored in whole or in part in the system memory 540.

Such instruction sets 514 may be transferred, in whole or in part, from the one or more data storage devices 560. The instruction sets 514 may be loaded, stored, or otherwise retained in system memory 540, in whole or in part, during execution by the processor cores 518 and/or graphics processor circuitry 512.

The computing device 500 may include power management circuitry 550 that controls one or more operational aspects of the energy storage device 552. In embodiments, the energy storage device 552 may include one or more primary (i.e., non-rechargeable) or secondary (i.e., rechargeable) batteries or similar energy storage devices. In embodiments, the energy storage device 552 may include one or more supercapacitors or ultracapacitors. In embodiments, the power management circuitry 550 may alter, adjust, or control the flow of energy from an external power source 554 to the energy storage device 552 and/or to the computing device 500. The power source 554 may include, but is not limited to, a solar power system, a commercial electric grid, a portable generator, an external energy storage device, or any combination thereof.

For convenience, the processor cores 518, the graphics processor circuitry 512, the wireless I/O interface 520, the wired I/O interface 530, the storage device 560, accelerator 120/170 and the network interface 570 are illustrated as communicatively coupled to each other via the bus 516, thereby providing connectivity between the above-described components. In alternative embodiments, the above-described components may be communicatively coupled in a different manner than illustrated in FIG. 5. For example, one or more of the above-described components may be directly coupled to other components, or may be coupled to each other, via one or more intermediary components (not shown). In another example, one or more of the above-described components may be integrated into the processor cores 518 and/or the graphics processor circuitry 512. In some embodiments, all or a portion of the bus 516 may be omitted and the components are coupled directly to each other using suitable wired or wireless connections.

A flowchart representative of example hardware logic, non-tangible machine-readable instructions, hardware implemented state machines, and/or any combination thereof for implementing computing device 500 (including accelerator 120/170), for example, are shown in FIG. 3. The machine-readable instructions may be one or more executable programs or portion(s) of an executable program for execution by a computer processor such as the processor 510 shown in the example computing device 500 discussed. The program may be embodied in software stored on a non-transitory computer readable storage medium such as a CD-ROM, a floppy disk, a hard drive, a DVD, a Blu-ray disk, or a memory associated with the processor 510, but the entire program and/or parts thereof could alternatively be executed by a device other than the processor 510 and/or embodied in firmware or dedicated hardware. Further, although the example program is described with reference to the flowchart illustrated in FIG. 3, many other methods of implementing the example computing devices 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer system, but require addition of a library (e.g., a dynamic link library (DLL)), a software development kit (SDK), an application programming interface (API), etc., in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 3 may be implemented using executable instructions (e.g., computer and/or machine-readable instructions) stored on a non-transitory computer and/or machine-readable medium such as a hard disk drive, an SSD, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus including a memory, the memory storing a mode; and polynomial multiplier circuitry including at least one modulus multiplier, the at least one modulus multiplier including a multiplier to multiply two polynomial coefficients to generate a multiplication result, a power of two reducer to reduce the multiplication result to a reduced multiplication result when the mode is a power of two mode, and a prime modulus reducer to reduce the multiplication result to the reduced multiplication result when the mode is a prime modulus mode.

In Example 2, the subject matter of Example 1 can optionally include wherein the power of two mode indicates a key encapsulation mechanism (KEM) based on learning with rounding (LWR).

In Example 3, the subject matter of Example 1 can optionally include wherein the prime modulus mode indicates a key encapsulation mechanism (KEM) based on learning with error (LWE).

In Example 4, the subject matter of Example 1 can optionally include wherein polynomial coefficients are for degree-256 polynomials.

In Example 5, the subject matter of Example 1 can optionally include wherein the multiplier is to multiply the two polynomial coefficients in number theoretic transform (NTT) representation when the mode is prime modulus.

In Example 6, the subject matter of Example 1 can optionally include wherein the power of two reducer is to generate the reduced multiplication result as n least significant bits of the multiplication result, where n is a natural number.

In Example 7, the subject matter of Example 1 can optionally include wherein the prime modulus reducer is to generate the reduced multiplication result as the multiplication result modulo a selected prime number.

In Example 8, the subject matter of Example 1 can optionally include wherein the at least one modulus multiplier comprises a mode selector to select the power of two reducer when the mode is power of two and to select the prime modulus reducer when the mode is prime modulus.

In Example 9, the subject matter of Example 1 can optionally include wherein the polynomial multiplier includes M modulus multipliers, M being a natural number, the M modulus multipliers to generate reduced multiplication results in parallel.

Example 10 is a method of multiplying two polynomial coefficients by a polynomial multiplier in accelerator circuitry to generate a multiplication result; reducing the multiplication result to a reduced multiplication result when a mode of operating the polynomial multiplier is a power of two mode and reducing the multiplication result to the reduced multiplication result when the mode is a prime modulus mode.

In Example 11, the subject matter of Example 10 can optionally include wherein the power of two mode indicates a key encapsulation mechanism (KEM) based on learning with rounding (LWR).

In Example 12, the subject matter of Example 10 can optionally include wherein the prime modulus mode indicates a key encapsulation mechanism (KEM) based on learning with error (LWE).

In Example 13, the subject matter of Example 10 can optionally include wherein polynomial coefficients are for degree-256 polynomials.

In Example 14, the subject matter of Example 10 can optionally include wherein multiplying two polynomial coefficients by a polynomial multiplier in accelerator circuitry to generate a multiplication result comprises multiplying the two polynomial coefficients in number theoretic transform (NTT) representation when the mode is prime modulus.

In Example 15, the subject matter of Example 10 can optionally include wherein reducing the multiplication result to a reduced multiplication result when a mode of operating the polynomial multiplier is a power of two mode comprises generating the reduced multiplication result as n least significant bits of the multiplication result, where n is a natural number.

In Example 16, the subject matter of Example 10 can optionally include wherein reducing the multiplication result to the reduced multiplication result when the mode is a prime modulus mode comprises generating the reduced multiplication result as the multiplication result modulo a selected prime number.

Example 17 is a computing system including a processor; a memory coupled to the processor, the memory having instructions stored thereon that, in response to execution by the processor, cause the processor to perform cryptographic operations; and an accelerator to perform cryptographic operations offloaded from the processor, the accelerator including a memory, the memory storing a mode, and polynomial multiplier circuitry including at least one modulus multiplier, the at least one modulus multiplier including a multiplier to multiply two polynomial coefficients to generate a multiplication result, a power of two reducer to reduce the multiplication result to a reduced multiplication result when the mode is a power of two mode, and a prime modulus reducer to reduce the multiplication result to the reduced multiplication result when the mode is a prime modulus mode.

In Example 18, the subject matter of Example 17 can optionally include wherein the power of two mode indicates a key encapsulation mechanism (KEM) based on learning with rounding (LWR).

In Example 19, the subject matter of Example 17 can optionally include wherein the prime modulus mode indicates a key encapsulation mechanism (KEM) based on learning with error (LWE).

In Example 20, the subject matter of Example 17 can optionally include wherein polynomial coefficients are for degree-256 polynomials.

In Example 21, the subject matter of Example 17 can optionally include wherein the multiplier is to multiply the two polynomial coefficients in number theoretic transform (NTT) representation when the mode is prime modulus.

In Example 22, the subject matter of Example 17 can optionally include wherein the power of two reducer is to generate the reduced multiplication result as n least significant bits of the multiplication result, where n is a natural number.

In Example 23, the subject matter of Example 17 can optionally include wherein the prime modulus reducer is to generate the reduced multiplication result as the multiplication result modulo a selected prime number.

Example 24 is an apparatus including means for multiplying two polynomial coefficients by a polynomial multiplier in accelerator circuitry to generate a multiplication result; means for reducing the multiplication result to a reduced multiplication result when a mode of operating the polynomial multiplier is a power of two mode and means for reducing the multiplication result to the reduced multiplication result when the mode is a prime modulus mode.

What is claimed is:

1. An apparatus comprising:
a memory, the memory storing a mode; and
polynomial multiplier circuitry including at least one modulus multiplier circuit, the at least one modulus multiplier circuit including a mode selector to select a power of two reducer circuit when the mode is power of two and to select a prime modulus reducer circuit when the mode is prime and a modulus multiplier to multiply two polynomial coefficients to generate a multiplication result, the power of two reducer circuit to reduce the multiplication result to a reduced multiplication result when the mode is a power of two mode for a key encapsulation mechanism (KEM) based on learning with rounding (LWR), and the prime modulus reducer circuit to reduce the multiplication result to the reduced multiplication result when the mode is a prime modulus mode for a KEM based on learning with errors (LWE).

2. The apparatus of claim 1, wherein polynomial coefficients are for degree-256 polynomials.

3. The apparatus of claim 1, wherein the modulus multiplier is to multiply the two polynomial coefficients in number theoretic transform (NTT) representation when the mode is prime modulus.

4. The apparatus of claim 1, wherein the power of two reducer circuit is to generate the reduced multiplication result as n least significant bits of the multiplication result, where n is a natural number.

5. The apparatus of claim 1, wherein the prime modulus reducer circuit is to generate the reduced multiplication result as the multiplication result modulo a selected prime number.

6. The apparatus of claim 1, wherein the polynomial multiplier circuitry includes M modulus multipliers, M being a natural number, the M modulus multipliers to generate reduced multiplication results in parallel.

7. A method comprising:
multiplying two polynomial coefficients by a polynomial multiplier by accelerator circuitry to generate a multiplication result;
selecting a power of two reducer in accelerator circuitry when a mode of operating the polynomial multiplier is power of two and selecting a prime modulus reducer in the accelerator circuitry when the mode is prime;
reducing the multiplication result to a reduced multiplication result by the power of two reducer for a key encapsulation mechanism (KEM) based on learning with rounding (LWR) in response to selecting the power of two reducer, and
reducing the multiplication result to the reduced multiplication result by the prime modulus reducer for a KEM based on learning with errors (LWE) in response to selecting the prime modulus reducer.

8. The method of claim 7, wherein polynomial coefficients are for degree-256 polynomials.

9. The method of claim 7, wherein multiplying two polynomial coefficients by a polynomial multiplier in accelerator circuitry to generate a multiplication result comprises multiplying the two polynomial coefficients in number theoretic transform (NTT) representation when the mode is prime modulus.

10. The method of claim 7, wherein reducing the multiplication result to a reduced multiplication result when a mode of operating the polynomial multiplier is a power of two mode comprises generating the reduced multiplication result as n least significant bits of the multiplication result, where n is a natural number.

11. The method of claim 7, wherein reducing the multiplication result to the reduced multiplication result when the mode is a prime modulus mode comprises generating the reduced multiplication result as the multiplication result modulo a selected prime number.

12. A computing system comprising:
a processor;
a memory coupled to the processor, the memory having instructions stored thereon that, in response to execution by the processor, cause the processor to perform cryptographic operations; and an accelerator circuitry to perform cryptographic operations offloaded from the processor, the accelerator circuitry including a memory, the memory storing a mode, and polynomial multiplier circuitry including at least one modulus multiplier circuit, the at least one modulus multiplier circuit including a mode selector to select a power of two reducer circuit when the mode is power of two and to select a prime modulus reducer circuit when the mode is prime and a multiplier circuit to multiply two polynomial coefficients to generate a multiplication result, the power of two reducer circuit to reduce the multiplication result to a reduced multiplication result when the mode is a power of two mode for a key encapsulation mechanism (KEM) based on learning with rounding (LWR), and the prime modulus reducer circuit to reduce the multiplication result to the reduced multiplication result when the mode is a prime modulus mode for a KEM based on learning with errors (LWE).

13. The computing system of claim 12, wherein polynomial coefficients are for degree-256 polynomials.

14. The computing system of claim 12, wherein the modulus multiplier circuit is to multiply the two polynomial coefficients in number theoretic transform (NTT) representation when the mode is prime modulus.

15. The computing system of claim 12, wherein the power of two reducer circuit is to generate the reduced multiplication result as n least significant bits of the multiplication result, where n is a natural number.

16. The computing system of claim 12, wherein the prime modulus reducer circuit is to generate the reduced multiplication result as the multiplication result modulo a selected prime number.

17. At least one non-transitory machine-readable memory medium comprising instructions that, when executed, cause at least one processor:

multiply two polynomial coefficients by a polynomial multiplier circuit to generate a multiplication result;

select a power of two reducer in accelerator circuitry when a mode of operating the polynomial multiplier is power of two and select a prime modulus reducer in the accelerator circuitry when the mode is prime;

reduce the multiplication result to a reduced multiplication result by the power of two reducer for a key encapsulation mechanism (KEM) based on learning with rounding (LWR) in response to selecting the power of two reducer, and reduce the multiplication result to the reduced multiplication result by the prime modulus reducer for a KEM based on learning with errors (LWE) in response to selecting the prime modulus reducer.

* * * * *